United States Patent [19]
Nicolas

[11] Patent Number: 6,011,400
[45] Date of Patent: Jan. 4, 2000

[54] BUSHING FOR AN ELECTRICAL HIGH-FREQUENCY SIGNAL AND A MEASURING INSTRUMENT CONTAINING SAME

[75] Inventor: Christian Nicolas, Valence, France

[73] Assignee: Krohne A.G., Switzerland

[21] Appl. No.: 08/747,150

[22] Filed: Nov. 8, 1996

[51] Int. Cl.[7] ............................................. G01R 27/26
[52] U.S. Cl. ................................. 324/552; 174/209
[58] Field of Search .......................... 324/552, 553; 174/151, 152 R, 153 R, 209

[56] References Cited

U.S. PATENT DOCUMENTS

| | | | |
|---|---|---|---|
| 1,775,530 | 9/1930 | Jansson | 324/552 |
| 2,402,466 | 6/1946 | Terpak et al. | 324/552 |
| 3,710,242 | 1/1973 | Povey | 324/552 |
| 3,856,983 | 12/1974 | Fisher | 174/152 R |
| 4,237,415 | 12/1980 | Easley | 324/552 |
| 4,460,917 | 7/1984 | Rogers | 357/81 |
| 4,563,545 | 1/1986 | Dzomba | 174/209 |
| 4,956,903 | 9/1990 | Thuries | 174/209 |
| 5,140,270 | 8/1992 | Martin et al. | 324/552 |
| 5,272,442 | 12/1993 | Schemmel et al. | 324/552 |
| 5,373,242 | 12/1994 | Joulie | 324/552 |

*Primary Examiner*—Maura Regan
*Attorney, Agent, or Firm*—Cesari and McKenna, LLP

[57] ABSTRACT

A bushing for an electrical high-frequency signal, with at least one conductive element carrying the electrical high-frequency signal, with at least one mechanical supporting element and with at least two insulating elements between the conductive element and the supporting element that perform different functions. The bushing for an electrical high-frequency signal is designed so that the impedances of the insulating elements are basically identical.

4 Claims, 2 Drawing Sheets

BUSHING FOR AN ELECTRICAL HIGH-FREQUENCY SIGNAL AND A MEASURING INSTRUMENT CONTAINING SAME

The invention concerns a bushing for an electrical high-frequency signal, with at least one conductive element carrying the high-frequency signal, with at least one mechanical supporting element and with at least two insulating elements between the conductive element and the supporting element that perform different functions.

BACKGROUND OF THE INVENTION

Such bushings for electrical high-frequency signals are known from the state of the art (see FIG. 1 of drawings). The known bushings for electrical high-frequency signals are used, like the bushing in the invention for an electrical high-frequency signal, to take the electrical high-frequency signal from an exterior space that is subject regularly to normal ambient conditions into an interior space that is subject to special ambient conditions, like high or low pressure, high or low temperatures and a chemically corrosive atmosphere or vice versa from the interior space to the exterior space. Such a bushing consists of at least one conductive element carrying the electrical high-frequency signal, as a rule a metal electrical conductor, a mechanical supporting element used for attachment and stability, which is also made of metal as a rule, and one or more insulating elements between the conductive element and the supporting element to prevent electrical contact between the conductive element and the supporting element. It is already known from the state of the art how to arrange two insulating elements performing different functions between the conductive element and the supporting element. In the state of the art, the first insulating element is used to seal the interior space from the exterior space and the second insulating element to produce a certain compression resistance and a certain strength to chemically corrosive atmospheres or media.

Now the problem with bushings for electrical high-frequency signals, especially with extremely high frequencies, is that they are reflected at the junctions between the insulating elements and thus cannot be carried completely into the inside or exterior space. Besides these losses, there is the problem that the reflection of the high-frequency signals at these junctions between the insulating elements while the running time of high-frequency signals is being measured causes so called "dirt effects", like contamination effect, noise effect . . . , that are generally unwanted. Compared to the state of the art described, the task of the invention is based on designing the known bushings for an electrical high-frequency signal in such a way that the high-frequency signal passes through the bushing as unhindered as possible.

SUMMARY OF THE INVENTION

The task described above is solved by the invention by having the impedances of the insulating elements basically identical. This measure in the invention guarantees that because of the uniform impedance within the bushing, the high-frequency signal passes through it unhindered. The reflections that occur on the known bushings for electrical high-frequency signals at points where the impedance changes discontinuously are thus excluded.

Since the insulating elements that perform the different functions generally consist of different materials with different electrical properties based on the functionality desired, the theory in the invention provides a first embodiment in which, to achieve impedance matching, the geometric dimensions of the insulating elements are coordinated with the electrical properties of the materials in the insulating elements. This guarantees that, despite changing materials, the high-frequency signal always "sees" only one constant impedance in the area surrounding the conductive element.

According to another embodiment of the theory in the invention, the seal between the interior and exterior spaces is guaranteed by the fact that the first insulating element facing an electrical signal source is sealed from the conductive supporting elements. This seal makes sure that, for example, a corrosive atmosphere cannot occur in the exterior space, and hence the area of the electrical signal source, and so no damage can occur there either.

The compression resistance of the bushing in the invention for an electrical high-frequency signal is guaranteed by the fact that the first insulating element is made of a mechanically resistant ceramic. The compression resistance thus achieved is necessary both in the event that excess pressure occurs in the interior space and also in the event that the electrical signal source in the exterior space is in a closed container that is pressure-tight because it is explosion-proof.

Since because of the pressure-tight seal of the first insulating element, the second insulating element is on the side of the first insulating element away from the electrical signal source, it is advantageous if the second insulating element is supported on the first insulating element as an abutment. No additional impedance-changing abutment is necessary for this.

Since the second insulating element thus is in direct contact with the interior space in one embodiment of the bushing for an electrical high-frequency signal, as previously described, the insulating element does not need any special mechanical properties to ensure the compression resistance, and the bushing in the invention has an especially advantageous embodiment since the second insulating element is made of a chemically resistant plastic, preferably polytetrafluoroethylene. Purposeful selection of material for the second insulating element, without consideration for its mechanical properties, guarantees the bushing in the invention for an electrical high-frequency signal will be highly resistant to chemically corrosive atmospheres in the interior space.

The bushing in the invention for an electrical high-frequency signal is especially suitable for use in a TIME-DOMAIN-REFLECTOMETRY (TDR) measuring instrument for coupling an electrical pulse from the electrical signal source in the exterior space to a probe in the interior space, for example, of a container for storing liquid or solid media. A TDR measuring instrument is based on the fact that an electrical high-frequency signal carried in a probe, namely a very short time pulse, is reflected by the surface of the stored media bordering the probe which have different electrical properties, and thus the height of the respective surface in the container can be determined from the running time of the reflected signal. For a more detailed description of a TDR measuring instrument, please refer to the publication "MULTI-PHASE FLUID LEVEL MEASUREMENT BY TIME-DOMAIN-REFLECTOMETRY" of Cambridge Consultants Ltd., of Feb. 25, 1993.

In the connection of a bushing for a high-frequency electrical signal in the invention to a TDR measuring instrument described, the bushing in the invention has an especially advantageous design due to the fact that the impedance of the bushing in the invention is basically identical to the impedance on the signal path of the TDR measuring instrument. Such impedance adjustment guarantees complete avoidance of reflections of the high-frequency signal, except for the desired reflections on the surface levels of the stored media. Hence the measurement accuracy of a TDR measuring instrument designed in this way is clearly improved.

Now, there are many ways of designing and developing the bushing for an electrical high-frequency signal in the invention. For them, please refer to the dependent patent claims, on one hand, and to the description of a preferred example of embodiment in connection with the drawings, on the other hand.

Figure 1:
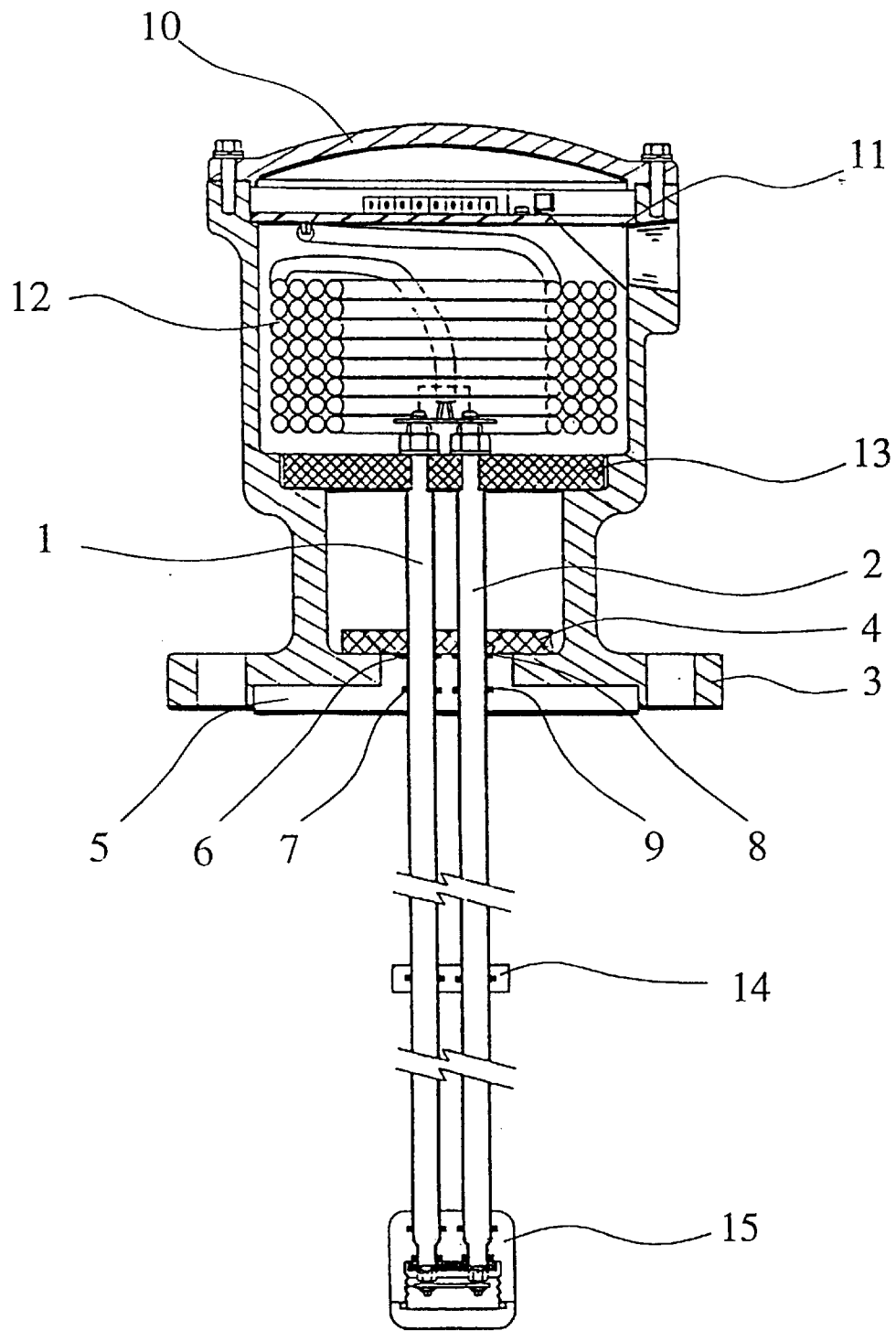
FIG. 1 shows a partial section of an example of an embodiment of a bushing known from the state of the art for an electrical high-frequency signal connected to a TDR measuring instrument.

The drawing in FIG. 1 shows a bushing for an electrical high-frequency signal known from the state of the art connected to a TDR measuring instrument. This known bushing has two conductive elements 1, 2 carrying the electrical high-frequency signal, a mechanical supporting element 3 designed in one piece with the housing of the TDR measuring instrument, and two insulating elements 4, 5 between the conductive elements 1, 2 and the supporting element 3. The first insulating element 4 and the second insulating element 5 are designed in the state of the art in such a way that they work together mechanically in a suitable way. The insulating elements 4, 5 are not designed with regard to the electrical properties, especially with regard to the impedance of the conductive elements 1, 2 for the electrical high-frequency signal, which can undoubtedly be recognized by the changing diameter of the second insulating element and the thus changing impedance over the length of the conductive elements 1, 2.

In the state of the art, the first insulating element performs only a sealing function; while the second insulating element guarantees on one hand the mechanical stability of the bushing and on the other hand the resistance of the bushing to chemical corrosive atmospheres or media. The second insulating element 5 also performs an additional sealing function in connection with the O rings 6, 7, 8, 9.

In the bushing known from the state of the art for an electrical high-frequency signal, therefore, neither the signal passing through the bushing nor the division of tasks between the first insulating element 4 and the second insulating element 5 is solved optimally.

FIG. 1 also shows the housing of the TDR measuring instrument designed in one piece with the mechanical supporting element 3, the accompanying housing cover 10, a plate 11 holding an electrical signal source, a coiled delay line 12, a third insulating element 13 guaranteeing another seal, the probes designed in one piece with the conductive elements 1, 2, a spacing element 14 and finally a terminal element 15 forming the terminal of the probes. The precise function of these other elements is not decisive to the theory in the invention so it is not explained further here.

Figure 2:
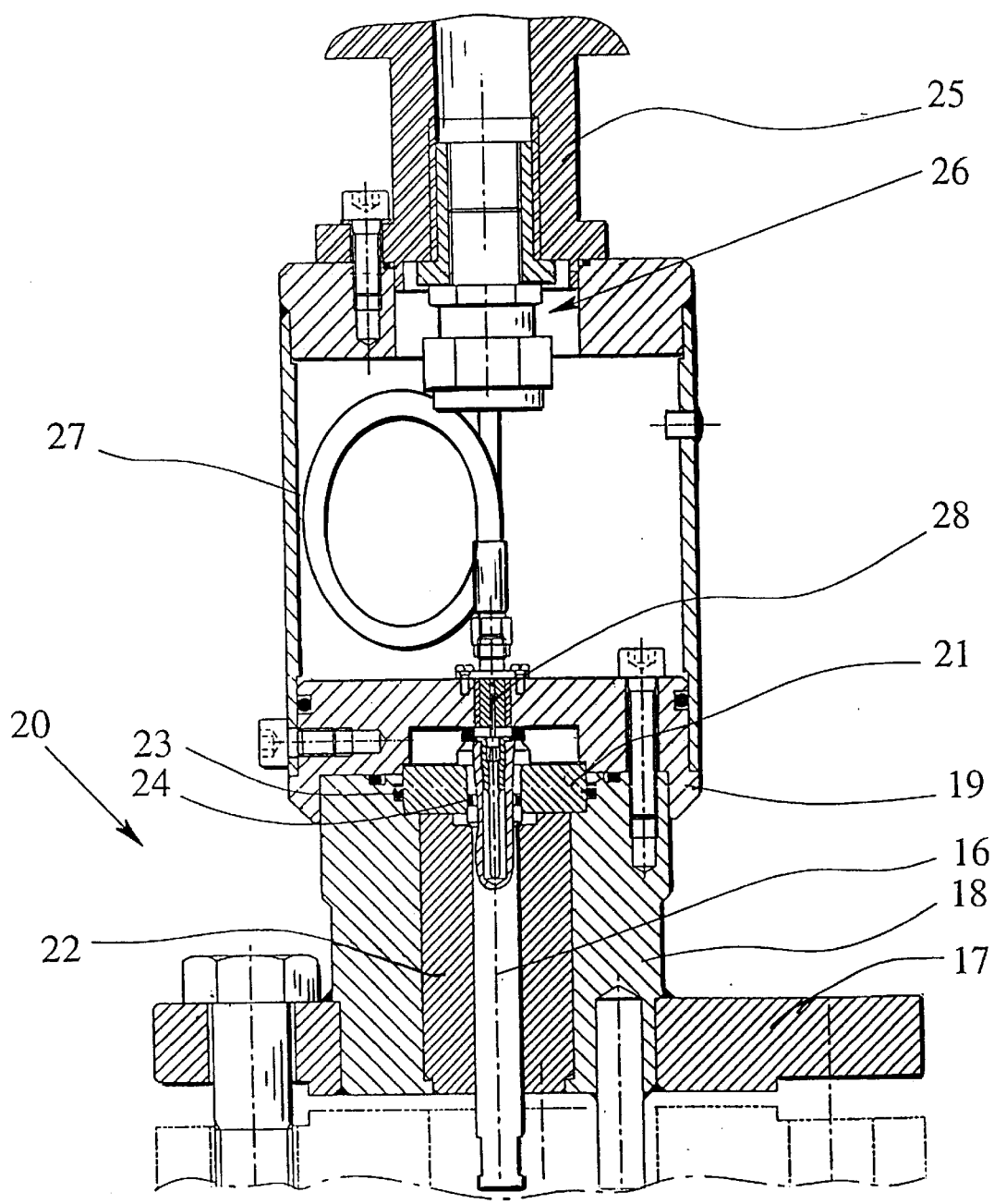
FIG. 2 shows a partial section of an example of an embodiment of the bushing according to the invention for an electrical high-frequency signal connected to a TDR measuring instrument.

The drawing in FIG. 2 shows an example of embodiment of a bushing in the invention for an electrical high-frequency signal., also connected to a TDR measuring instrument. The bushing in the invention shown in FIG. 2 for an electrical high-frequency signal has a conductive element 16 carrying the electrical high-frequency signal, a mechanical supporting element 20 consisting of a flange 17, a cylinder 18 and a terminal plate 19 and two insulating elements 21, 22 between the conductive element 16 and the supporting element 20.

According to the invention, the impedances of the insulating elements 21, 22 are basically identical, so that reflection of the electrical high-frequency signal at the junction between the first insulating element 21 and the second insulating element 22 is basically ruled out.

Since the first insulating element 21 is designed as a mechanically resistant ceramic to guarantee the mechanical stability of the bushing against external pressure, the ceramic also works with two O rings 23, 24 that guarantee the seal on the bushing, and since the second insulating element 22 is made of a chemically resistant plastic, namely polytetrafluoroethylene, to guarantee the resistance of the bushing to corrosive atmospheres or media, and since the ceramic and polytetrafluoroethylene have different electrical properties, the geometric dimensions, here the diameter of the insulating elements 21, 22, are chosen to be recognizably different so that an identical impedance of the insulating elements 21, 22 is guaranteed as a result.

FIG. 2 shows that the second insulating element 22 is supported on the first insulating element 21 as an abutment to the external pressures existing in the interior space of a container not shown in greater detail.

The other components of a TDR measuring instrument shown in FIG. 2 are not important to the theory in the invention. Thus, FIG. 2 only sketches the electronic housing 25 that holds the electronic components. In the event that the TDR measuring instrument shown is used in an area where there is a danger of explosion, an explosion-proof bushing 26 is shown in the illustrated embodiment. A delay line is available in the example of embodiment shown in FIG. 2 by a coiled cable 27. Lastly, another gas-tight bushing 28 is arranged in the terminal plate 19 of the mechanical supporting element 20, and it guarantees additional safety.

I claim:

1. A bushing for an electrical high-frequency signal emanating from a signal generator, with one conductor (16) carrying the electrical high-frequency signal, with one mechanical support element (2), and with two isolation elements (21, 22), performing different functions, provided between the conductor (16) and the support element (20), wherein a first isolation element (21) facing the electrical signal generator is sealed off from the conductor (16) and the support element (20), consists of a mechanically resistant ceramic and serves as a counter-support for a second isolation element (22) and the second isolation element (22) consists of a chemically resistant plastic, the geometrical dimensions of said two isolation elements (21, 22) being so proportioned in relation to the electrical properties of the materials constituting said two isolation elements (21, 22) that the impedances of said two isolation elements (21, 22) are substantially identical.

2. The bushing defined in claim 1 characterized in that said second isolation element (22) consists of polytetrafluoroethylene.

3. A time-domain-reflectometry measuring instrument, characterized in that an electrical high-frequency signal emanating from the electrical signal generator can be coupled into a probe by way of a bushing as defined in claim 1.

4. The time-domain-reflectometry measuring instrument defined in claim 3, characterized in that the impedance of the bushing is substantially identical to the impedance of the signal path of the time-domain-reflectometry measuring instrument.

* * * * *

UNITED STATES PATENT AND TRADEMARK OFFICE
CERTIFICATE OF CORRECTION

PATENT NO.   : 6,011,400
DATED        : January 4, 2000
INVENTOR(S)  : Christian Nicolas It is certified that error appears in the above-identified patent and that said Letters Patent is hereby corrected as shown below:

On the title page,
 —Foreign Application Priority Data
 November 9, 1995 [DE] Fed. Rep. of Germany .... 19541669.4—

Signed and Sealed this

Fifteenth Day of August, 2000

Attest:

Q. TODD DICKINSON

Attesting Officer

Director of Patents and Trademarks